J. KULHANEK.
MANURE LOADER.
APPLICATION FILED SEPT. 19, 1912.
1,081,124.
Patented Dec. 9, 1913.
5 SHEETS—SHEET 1.
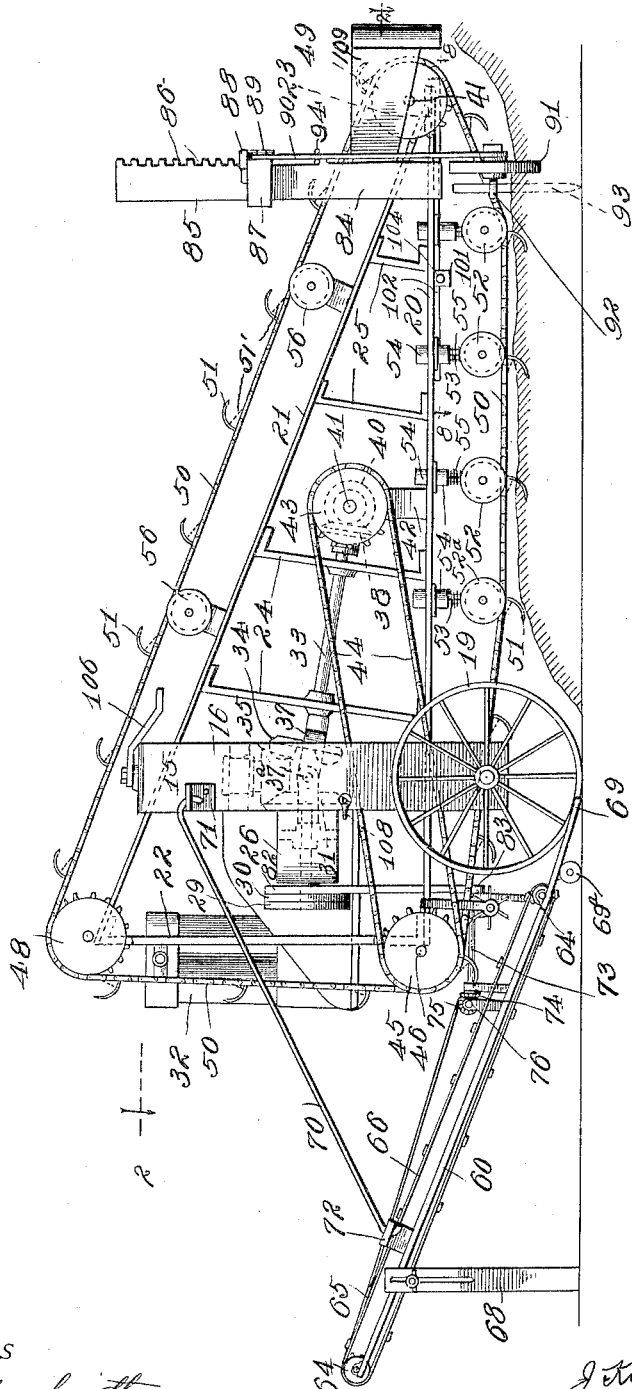
WITNESSES
INVENTOR

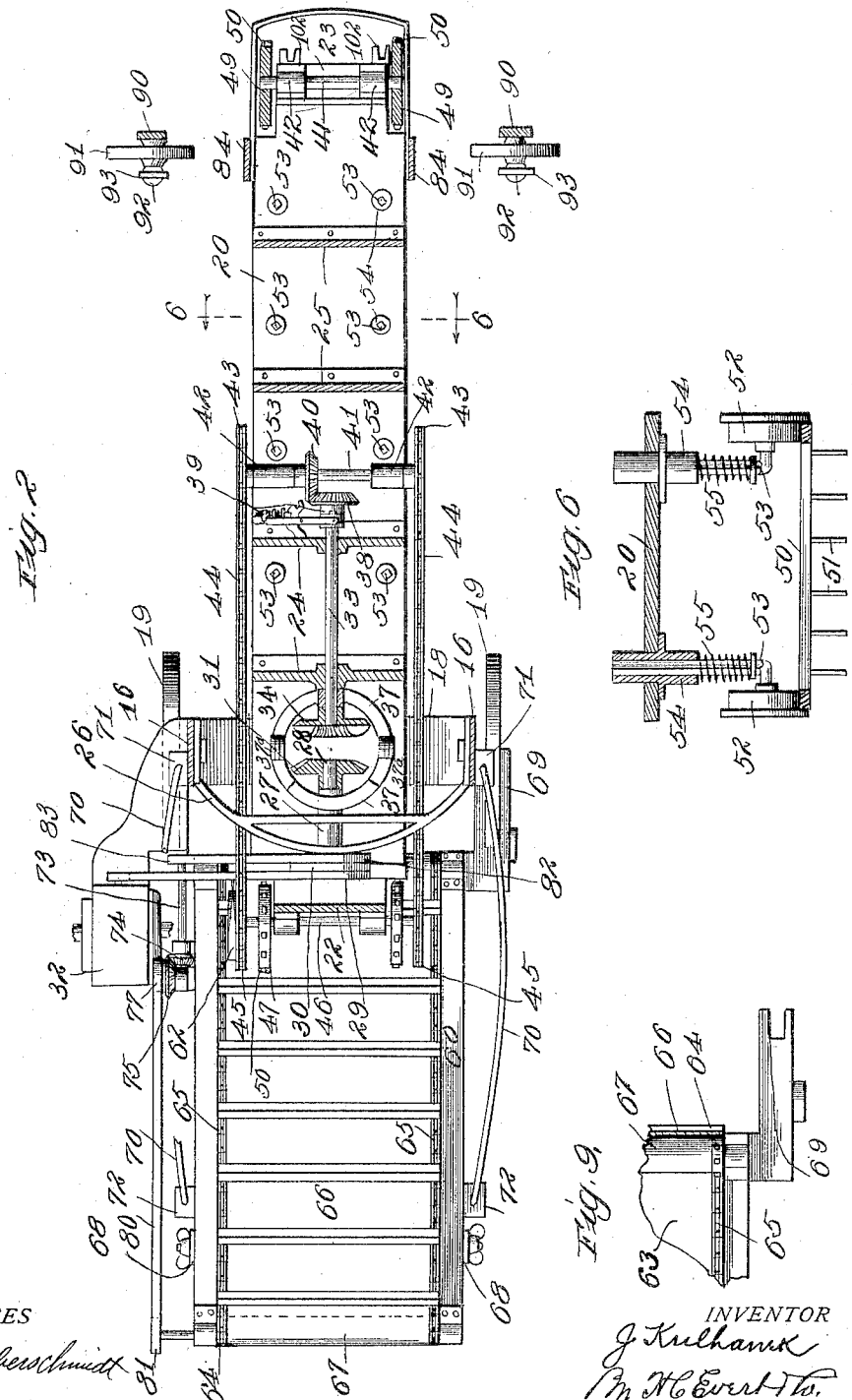

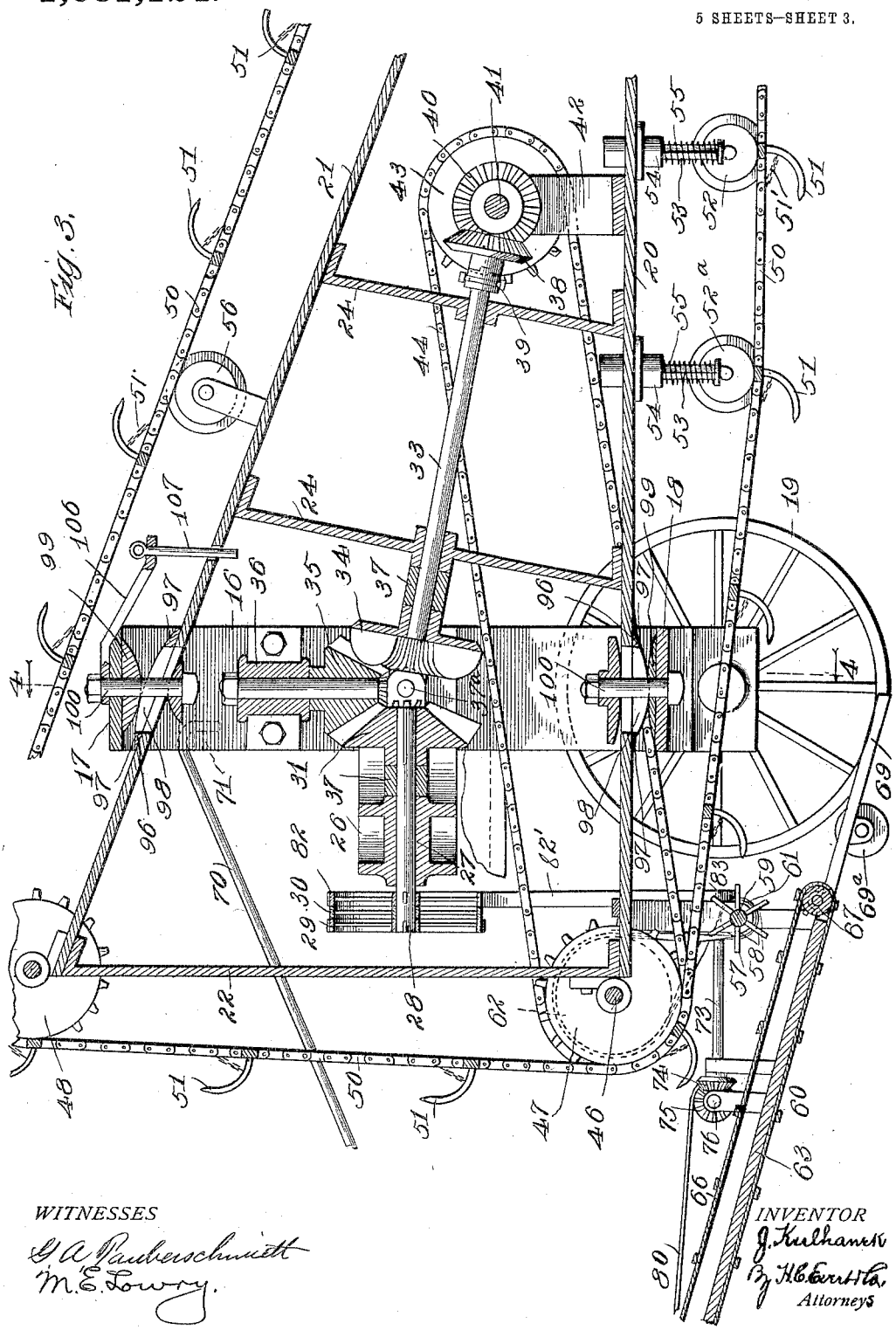

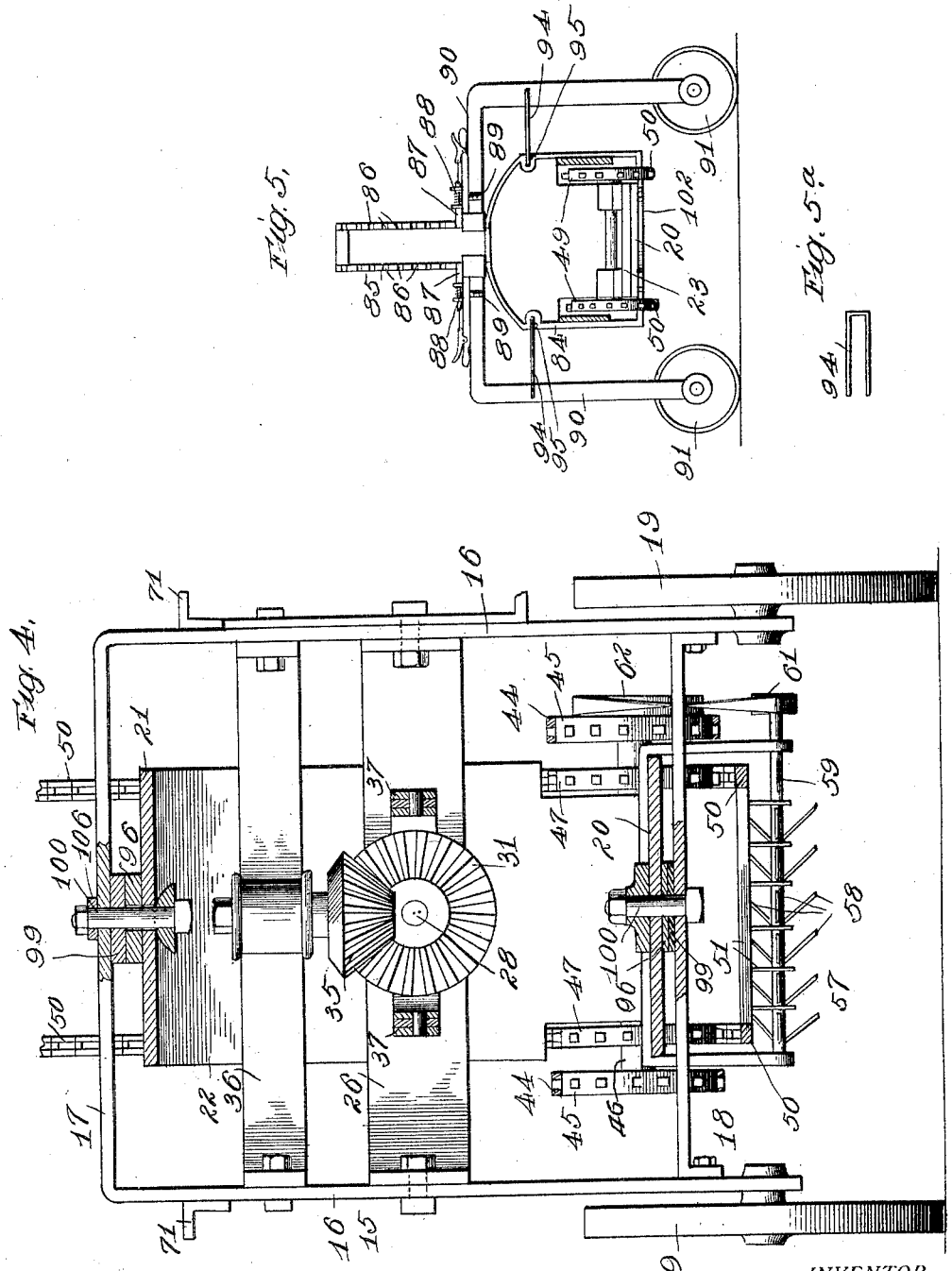

J. KULHANEK.
MANURE LOADER.
APPLICATION FILED SEPT. 19, 1912.

1,081,124.

Patented Dec. 9, 1913.
5 SHEETS—SHEET 5.

WITNESSES

INVENTOR
J. Kulhanek
By H. C. Evert & Co.,
Attorneys

UNITED STATES PATENT OFFICE.

JOSEPH KULHANEK, OF CHESANING, MICHIGAN.

MANURE-LOADER.

1,081,124.  Specification of Letters Patent.  Patented Dec. 9, 1913.

Application filed September 19, 1912. Serial No. 721,257.

*To all whom it may concern:*

Be it known that I, JOSEPH KULHANEK, a subject of the Emperor of Austria-Hungary, and residing at Chesaning, in the county of Saginaw and State of Michigan, have invented certain new and useful Improvements in Manure-Loaders, of which the following is a specification.

My invention relates to new and useful improvements in manure loaders, and has for its main object to simplify machines of this character and to provide such a machine with means thereon for the traction of the same, and to further provide a machine capable of being adjusted laterally while in working position to provide for a greater range of use for the carrying forks of the machine.

The invention has for its further object to provide a machine of this type capable also of adjustment vertically to regulate the depth at which the forks enter the manure, and to further provide in such a machine, means for securely locking the machine in working position, and for locking the frame of the machine during transportation from one point to another.

Figure 8:
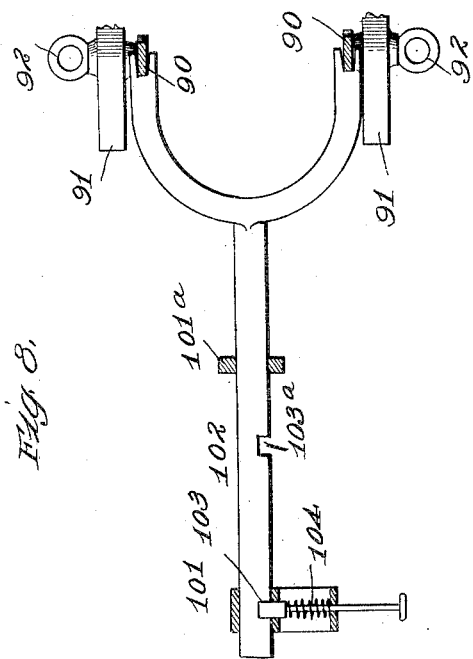
Figure 7:
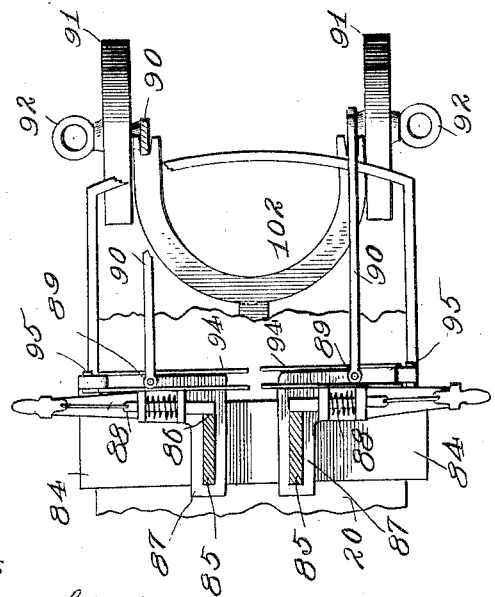

With the above and other objects in view, the invention consists in the novel construction, combination and arrangement of parts as will be hereinafter more specifically described and then particularly claimed, and in describing the invention in detail, reference will be had to the accompanying drawings forming a part of this description, and wherein like numerals of reference indicate like parts throughout the different views, in which:

Figure 1 is a side elevation showing the machine in operative position. Fig. 2 is a sectional plan view of the same taken on the line 2—2, Fig. 1. Fig. 3 is an enlarged central vertical section of the forward part of the machine. Fig. 4 is a cross-section on the line 4—4 of Fig. 3. Fig. 5 is an end elevation of the rear of the machine. Fig. 5ª is a detail plan of one of the upper locking levers. Fig. 6 is an enlarged detail sectional view on the line 6—6, Fig. 2. Fig. 7 is an enlarged plan view of the rear of the machine showing the rear wheels in their locked position so the machine can be transported. Fig. 8 is an enlarged detail plan of the means for locking the rear wheels for transporting the machine taken on line 8—8 of Fig. 1, and, Fig. 9 is a detail of the carrier.

The drawings described briefly above illustrate a practical embodiment of the machine, and will now be described in detail, it being understood that changes or alterations may be made in the details of construction without departing from the scope of the invention as claimed.

The discharge end of the machine is supported upon a movable and adjustable frame 15 of substantially inverted U-form. This frame 15 is composed of two vertical members 16, and upper and lower horizontal cross bars 17 and 18. At or near the lower ends of the vertical members 16 are spindles on which are mounted wheels 19 to assist in transporting the machine.

The tiltable frame of the machine carrying the operating machanism is somewhat triangular in form and is composed of a lower horizontal member 20 and an upwardly inclined member 21, connected together at the front by a vertical brace 22 and at rear by a flange 23. This frame is also strengthened by intermediate braces 24 and 25.

The mechanism for loading the manure is as follows: Upon the vertical members 16 of the supporting frame 15, I secure a bracket 26 (see Fig. 3). This bracket is provided with a suitable bearing 27 in which is journaled a shaft 28, to the outer end of which is secured fast and loose pulleys 29 and 30. A bevel gear 31 is carried by the inner end of the shaft to transmit power to the loading mechanism. Motion is imparted to shaft 28 by a motor 32, supported on the frame 15. Journaled in bearings in the braces 24 is a shaft 33 and at the outer end of this shaft is keyed a bevel gear 34. This bevel gear 34 is provided with semi-circular teeth to allow for the adjustment of the machine and is driven by the bevel gear 31 through the medium of an intermediate pinion 35, fixed on a cross-brace fastened to the vertical members 16 of the supporting frame. The shafts 28 and 33 are journaled in a gimbal joint 37 which is hinged at 37ª to connect the gears 31 and 34 and keep them in operative relation to each other. Upon the forward end of the shaft 33 is loosely mounted a bevel gear 38 which is controlled by a clutch 39. The bevel gear 38 is in mesh with a bevel gear 40 secured on a counter shaft 41.

The shaft 41 is journaled in suitable bearings 42 secured to the lower member 20 of the frame of the machine. Sprocket wheels 43 are secured to the outer ends of shaft 41 and transmit motion through chains 44 to sprocket wheels 45 on a shaft 46 journaled at the lower end of the vertical brace 22 at the discharge end of the machine. The shaft 46 also carries sprocket wheels 47 which are driven by sprockets 49 on shaft 41 through the medium of chains 50. To the chains 50 are rigidly secured a number of forks 51 which carry the manure from the manure pile to the discharge end of the machine. In order to relieve strain on the forks small chains 51′ are preferably provided therefor.

In order that the forks 51 will pick up a proper amount of material as they pass over the pile, I provide a number of spring-pressed flanged pulleys 52; these pulleys are engaged by the chains 50 during the travel of the latter beneath the frame, and are mounted upon stub shafts 53, having their upper ends squared to prevent rotation and are slidably secured in bearings 54 fastened to the lower member 20 of the frame of the machine. Springs 55 press the chains downward until they have passed the last sprocket 52ª of the series when they will rise and carry their load into the path of the discharging mechanism. In their travel above the frame, the chains 50 are supported by idlers 56 mounted upon the upper member 21 of the frame of the machine.

57 designates the discharging mechanism generally and consists of a plurality of teeth 58 fastened to a shaft 59. These teeth are set at an angle as shown in Fig. 4 and pass between the tines of the forks 51 throwing the manure upon a carrier 60. On the shaft 59 is secured a small pulley 61 which is driven by a cross belt on a larger pulley 62 on the shaft 46 by which a rapid rotary movement is imparted to the discharging mechanism.

The carrier 60 consists of a frame 63 having a shaft at each end upon which is mounted sprocket wheels 64 connected by chains 65. To these chains 65 is secured an endless slatted apron 66 supported on drums 67 mounted on the shafts which carry the sprockets 64. Near the discharge end the carrier is supported by adjustable legs 68 by which the height at the point of discharge is regulated. At the inner end of the carrier frame notched extensions 69 are provided which, engaging the wheels 19 on the supporting frame bring the carrier to its proper position under the discharging mechanism 57. Rest wheels 69ª are preferably provided for the inner end of the frame 63. The carrier is also connected to the supporting frame 15 by rods 70 which are secured to clips 71 on the vertical members 16 of said frame and clips 72 on the carrier frame 63. These rods 70 are curved outward to allow the machine to be turned at any angle and the carrier 60 is of sufficient width to catch the manure should the machine be so turned. It will be understood that the carrier conveys the material being loaded to a wagon or other vehicle positioned to receive the material from the carrier.

Journaled in suitable bearings upon the carrier frame 63 is a shaft 73 (see Fig. 2). On one end of this shaft is a bevel gear 74 which meshes with a bevel gear 75 on a stub shaft 76; upon this shaft 76 is also secured a pulley 77. A belt 80 drives the carrier belt by means of a pulley 81 on the upper sprocket shaft of the frame 63. Motion is transmitted to the shaft 73 by means of a pulley 82 on the shaft 28 and pulley 83 on the shaft 73, and belt 82′ traveling on pulleys 82, 83.

In order to adjust the machine to any height, I provide the following mechanism: Upon the inner end of the machine frame is rigidly fastened a frame 84. This frame rises to a height sufficient to allow the fork carrying chains to pass through and is then contracted as at 85, (Fig. 5) rising to a considerable height and having upon its edges teeth 86; slidably mounted upon the rack extension 85 are boxes 87, locked in position by locking levers 88. Hinged to the boxes 87 at 89 are two angular wheel supporting members 90 on the lower end of which are journaled wheels 91; a ring 92 is secured to the journals of said wheels through which pins 93 are driven firmly holding the wheels from movement when the machine is in operation. The wheel supporting members are also rigidly secured by forked levers 94 pivoted upon the frame 84. When the machine is in operative position, these levers are thrown forward resting upon lugs 95 firmly holding the upper end of the wheel supporting members and when the machine is to be transported are thrown inward releasing said supports. To allow for the adjustment of the machine at its discharge end, I provide bearing plates 96 (see Fig. 3) fastened to the upper and lower members 21 and 20 of the frame of the machine, the ends of said plates being tapered as at 97 and the plates being slotted as at 98 to allow for the raising or lowering of the rear end of the machine which is accomplished by releasing the locking levers 88 from the racks 86 and then applying pressure to the upper end 85 of the frame 84, or this end of the machine will drop by gravity. Upon the upper and lower cross braces 17 and 18 of the supporting frame 15, I provide bearing plates 99. The plates 96 and 99 are connected at top and bottom of the frame by bolts 100 that extend through slots 98 and form bearings that will accommodate themselves to any position of the machine. Slidably supported in bearings 101 and 101ª on the under side of the machine frame member 20 is a bifurcated locking lever 102. This lever is squared part of its length to prevent rotation and is provided with notches 103 and 103ª. The bearing 101 is provided with a spring-controlled locking lever 104 which engages in notch 103 when the machine is ready for transportation; when the machine is in working position, the bifurcated lever 102 is pushed back until the lever 104 registers with notch 103ª releasing the wheels and permitting them to be turned to the working position. Clips 108 are fastened to the vertical members 16 of the frame 15 to enable the operator to attach horses for transporting the machine. A guard 109 is provided at the inner end of the frame to prevent danger of contact with the forks 51.

The endless carrier apron, it will be observed, is of materially greater width than the carrier for the forks, and this allows of an adjustment of the frame so as to cause the forks to cover a greater range without necessitating moving of the machine to a new working position, this materially facilitating the work, while the tiltably-mounted frame provides for ready adjustment of the fork carrier so as to regulate the engagement of the forks with the material being loaded.

The operation of the machine is as follows: The machine is conveyed over the pile of manure to be loaded as shown in Fig. 1 The wheels 91 are locked in the position shown in Figs. 2 and 5, the pins 93 passed through the rings 92 and firmly driven in the ground; the forked levers 94 lock the upper end of the wheel supporting frame, and the machine is locked in its working position. The forks 51 on chains 50 pass over the sprockets 49 passing under the machine where they are held in engagement with the manure by the spring-pressed flanged pulleys 52; then rising, pass over the discharging mechanism 57 which throws the manure on the carrier 60. The forks then pass upward and rearward empty. When it is desired to change the position of the machine or transport it, the pins 93 and forked levers 94 are withdrawn, the wheel supporting members are then swung backward on their hinges 89 into the position shown in Figs. 7 and 8, and locked by the bifurcated lever 102.

What I claim is:—

1. A manure loader comprising a pivotally mounted supporting frame, spaced vertical racks carried by said frame adjacent to one end thereof, adjustably positioned boxes slidably mounted upon said racks, angular supporting members carried by said boxes and hingedly positionable transversely and longitudinally of said frame, ground wheels journaled upon the lower ends of said supporting members and an upper and a lower securing means for each of said supporting members operable with the loader positioned for use.

2. A loader comprising a pivotally mounted machine frame, an encircling frame rigidly secured to one end of the machine frame, a contracted rack extension upon said encircling frame, vertically shiftable boxes mounted upon said rack, rack-engaging locking means carried by said boxes, depending angular supporting members shiftably hinged to said boxes, ground wheels journaled to the lower ends of said members normally positioned rearwardly of the machine during a forward movement thereof, and forked levers pivoted to said encircling frame adapted for engaging said supporting members to outwardly position said wheels transversely of said machine frame.

3. In a manure loader, a freely pivoted frame, vertically adjustable angular supports hinged for rearward movement at opposite points upon said frame, ground wheels journaled at the bottoms of said supports positionable rearwardly of said frame upon a longitudinal movement thereof and upon opposite sides of said frame upon a transverse movement thereof and retaining means for said supports.

In testimony whereof I affix my signature in presence of two witnesses.

JOSEPH KULHANEK.

Witnesses:
 THEODORE S. GREENFELDER,
 F. J. STEVENS.

Copies of this patent may be obtained for five cents each, by addressing the "Commissioner of Patents, Washington, D. C."